April 1, 1952     J. H. LORIMER     2,591,568
MACHINE FOR CUTTING TIES OR THE LIKE
Filed Jan. 22, 1949     2 SHEETS—SHEET 1
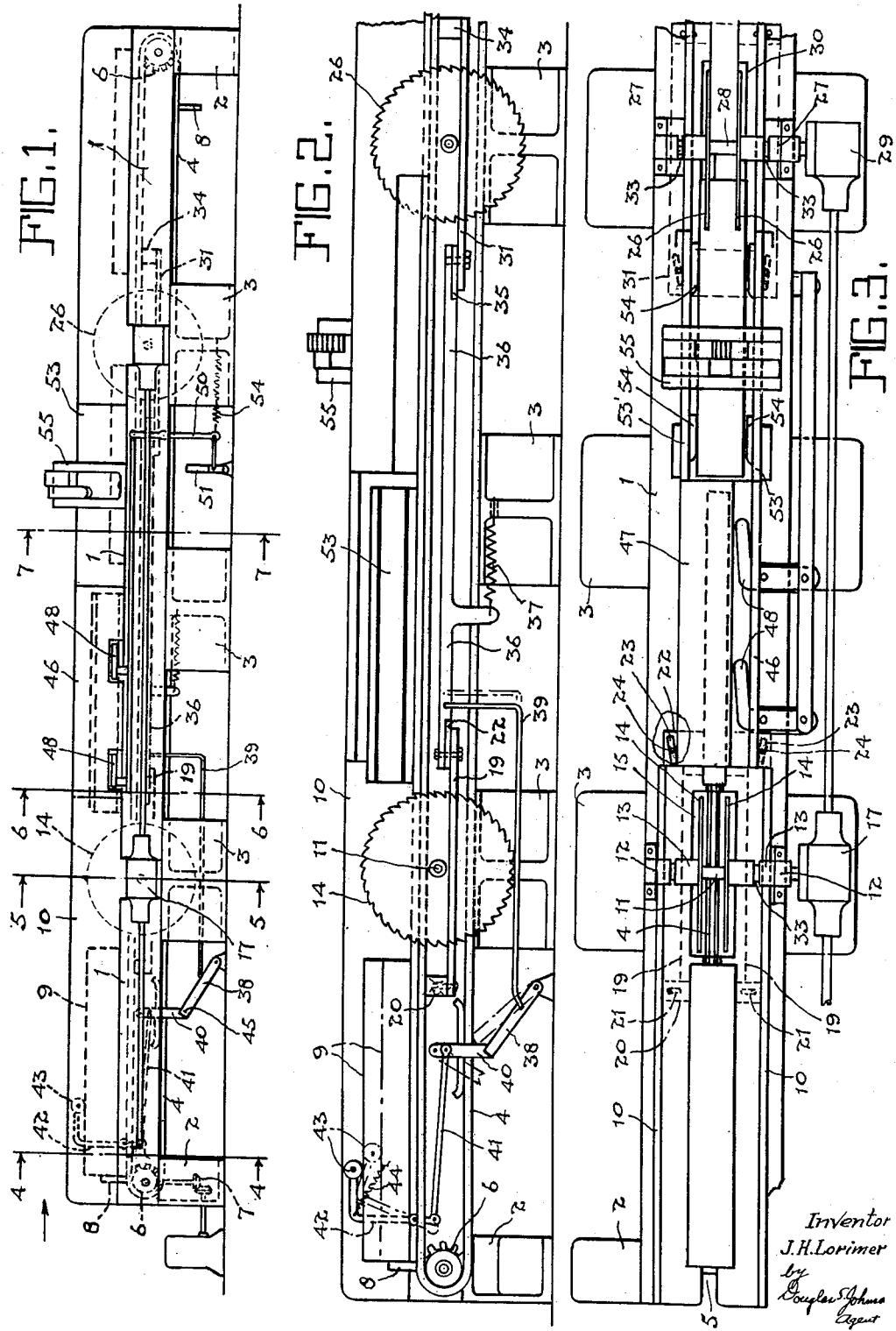

April 1, 1952  J. H. LORIMER  2,591,568
MACHINE FOR CUTTING TIES OR THE LIKE
Filed Jan. 22, 1949  2 SHEETS—SHEET 2
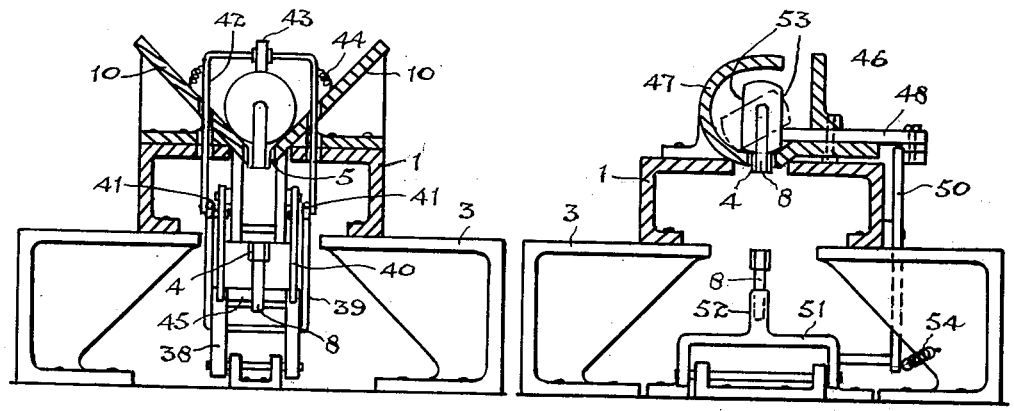
FIG. 4.  FIG. 6.
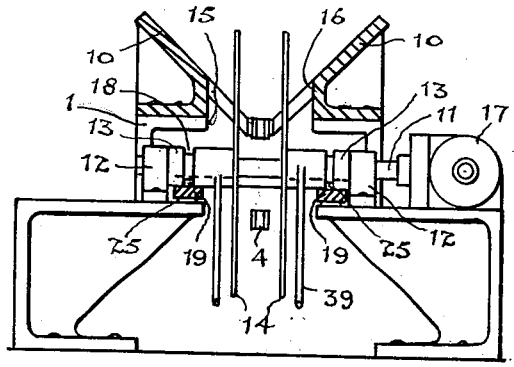 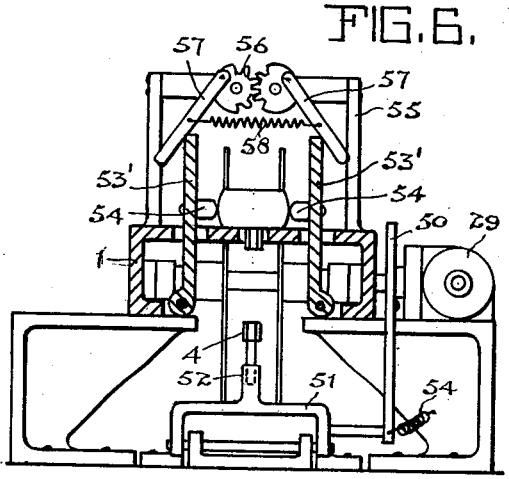
FIG. 5.  FIG. 7.
Inventor.
J. H. Lorimer
by Douglas S. Johnson
Agent Patented Apr. 1, 1952

2,591,568

UNITED STATES PATENT OFFICE 2,591,568

MACHINE FOR CUTTING TIES OR THE LIKE

James H. Lorimer, Toronto, Ontario, Canada

Application January 22, 1949, Serial No. 72,211

8 Claims. (Cl. 143—37)

This invention relates to a machine for cutting logs into squared timbers suitable for railway ties or the like, and the principal object of the invention is to provide an efficient high capacity and completely automatic machine which will effect the cutting of the log to provide a length of squared timber which may be used as railway ties or the like to enable such ties to be cut in exceedingly large quantities in a minimum of time.

A further important object is to provide a machine of the type described which will cut and square a continuous stream of logs without requiring the interruption of the movement of the logs at any point throughout the machine as they are passed through the machine.

A still further object is to provide a machine which will enable the logs to be cut to any desired cross sectional dimensions.

A still further object is to provide a machine which will automatically adjust itself to the varying sized logs presented thereto to prevent outsized logs from passing through the machine without being squared.

The principal feature of the invention consists in providing spaced-apart pairs of parallel saws arranging a conveyor to move a log between first one pair of saws to square opposite sides of the log and then between the other pair of saws, and providing means to turn the log about its longitudinal axis through 90° while passing from the first saw pair to the second saw pair whereby the second pair of saws square the remaining sides of the log to provide a length of timber of rectangular cross section.

A further important feature consists in supporting the saws of each saw pair for relative adjustment to enable the spacing therebetween to be adjusted while maintaining the saws in parallelism to adjust the cross sectional dimensions of the timber cut from the logs.

A still further feature consists in providing a novel caliper mechanism for controlling the spacing of the saws of each saw pair with the caliper mechanism operated by the logs inserted into the machine to automatically reset the saw spacings for cutting logs whose measurements differ materially from the average diameter of the logs being put through the machine.

A still further feature consists in providing a simple and efficient mechanism for overturning the logs between the saw pairs to ensure that the saw pairs cut the logs through planes substantially at right angles to each other to effect the squaring of the logs.

Referring to the accompanying drawings, Figure 1 is a side elevational view of a machine constructed in accordance with my invention.

Figure 2 is an enlarged mid-vertical sectional view of the main portion of the machine illustrating particularly the log-operated caliper mechanism for gauging the spacing of the saws.

Figure 3 is a plan view of the machine.

Figure 4 is a vertical transverse sectional view on the line 4—4 of Figure 1.

Figure 5 is a vertical transverse sectional view on the line 5—5 of Figure 1.

Figure 6 is a transverse vertical section on the line 6—6 of Figure 1.

Figure 7 is a transverse vertical section on the line 7—7 of Figure 1.

With reference to the drawings, the embodiment of my machine illustrated comprises a longitudinal, inverted channel-shaped bed frame 1 supported at the ends by the frames 2 and intermediate its length by the webbed frames 3.

Extending longitudinally of the bed frame 1 is an endless chain conveyor 4, the upper reach of which operates in a groove or slot 5 centrally of the bed plate, and the lower reach of which operates below the bed plate.

The chain 4 operates between the sprocket wheels 6 which are rotatably supported from the frame 1 adjacent the ends, with the sprocket wheel 6 at the front of the machine being driven through a suitable drive 7.

Carried by the chain 4 are the spaced outwardly projecting lugs or bosses 8 which are adapted to operate the logs 9 longitudinally of the bed plate and to operate the various other mechanisms, as hereinafter described.

Supported from the bed frame 1 and extending longitudinally thereof at the forward end of the machine are the V-guides 10, shown particularly in Figure 4, and these V-guides are adapted to centre a log 9 placed thereon to coincide with the longitudinal centre line of the bed frame.

Extending transversely of the bed frame beneath the upper surface thereof adjacent the ends of the guides 10 is a transverse shaft 11 rotatably supported in the journals 12, and mounted on this shaft and keyed thereto are the sleeves 13 to which are secured the circular saw blades 14 which project up through the relatively wide slots 15 and 16 in the frame 1 and guides 10 respectively, as shown in Figure 5.

The sleeves 13 are free to move longitudinally of the shaft 11 to change the spacing between the saws 14 but are constrained to rotate with the shaft 11 which is opertaed by the drive 17.

Each of the sleeves 13 is provided with an annular groove 18 and mounted beneath the shaft 11 are longitudinal bars 19 extending longitudinally of the bed frame and adjustably secured at one end to the transverse bar 20, Figure 3, provided with the longitudinal slots 21 and connected at the opposite end by the transverse bar 22 provided with the diagonal slots 23 through which project the pin or bolt extensions 24 carried by the bars 19.

Thus it will be seen that the spacing at the end of the bars 19 connected by the transverse bar 20 is adjustable by virtue of the slots 21, and the spacing of the opposite ends of the bars 19 is adjusted by movement of the transverse bar 22 longitudinally of the bed plate with the diagonal slots 23 forcing the pins 24 and hence the ends of the bars 19 to which the pins are secured inwardly or outwardly, depending upon the direction of the movement of the bar 22.

Carried by the bars 19 intermediate of their length are the rollers 25 which project into the annular grooves 18 in the sleeves 13 whereby the movement of the parallel saws 14 to change the spacing therebetween is effected by movement of the transverse bar 22. The preset adjustment of the initial position of the saws is obtained by adjusting the distance between the ends of the bars 19 connected by the transverse bar 20.

Arranged in spaced relation to the aforementioned set of saws 14 are a similar set of saws 26 carried on sleeves 27 arranged on the transverse shaft 28 journalled beneath the upper surface of the bed frame 1 and driven by the drive 29 as shown in Figure 7.

As in the case of the saws 14 the saws 26 operate through slots 30 in the bed frame with the faces of the saws in parallelism. The spacing of the saws 26 is controlled similarly to the spacing of the saws 14 by means of longitudinal bars 31 corresponding to the bars 19 and carrying rollers 32 engaging the grooves 33 of the saw sleeves 27 with the spacing of the longitudinal bars 31 being controlled by the longitudinally slotted transverse bar 34 and the diagonal slotted transverse bar 35 corresponding to the bars 20 and 22 respectively, as shown in Fig. 3.

Connecting the diagonally slotted transverse bars 22 and 35 is the bar 36 spring-urged by the spring 37 to move in a direction longitudinally of the bed frame to actuate the saws into closer parallel relation.

Extending between this bar 36 and the pivotal lever 38 arranged beneath the bed frame is a rod 39, and arranged above the lever 38 is a pivotal latch 40 connected by a rod 41 to the lower end of a lever 42, the upper end of which carries a roller 43 urged by the spring 44 into engagement with the periphery of the log 9 forming a caliper mechanism to gauge the size or diameter of the log.

From Figure 4 it will be seen that the lever 38 is in the form of a yoke, the cross piece 45 of which is arranged to extend into the path of the lugs 8 carried by the endless chain 4 when pulled forwardly by the spring 37.

The latch 40 is also in the form of a yoke or U and straddles the chain to engage lever 38.

In operation, as will be seen from Figure 2, the chain through its endless movement arrives at a point where its boss or lug 8 contacts the cross piece 45 of the lever 38, carrying the lever towards the forward end of the machine, and through the rod 39 and bar 36 moves the transverse bars 35 and 22 in a direction to increase the spacing of the saws to their maximum extent against the action of the spring 37.

Upon the chain lug moving out of contact with the lever 38 the lever is urged by the spring 37 to return to its original position. Upon insertion of the log 9 into the machine however the latch 40 has been operated by the caliper mechanism, including the roller 43, lever 42 and rod 41, to a position to block the return movement of the lever 38 where the diameter of the log being measured by the caliper mechanism is sufficient to enable the saws to square the log while spaced to their maximum extent.

The latch mechanism 40 may be arranged to swing freely in one direction to permit the lever 38 unobstructed movement toward the forward end of the machine but is held from movement in the reverse direction to prevent the unlatching of the lever 38.

Upon operating the lever 38 the chain lug 8 then contacts the log and moves it longitudinally of the bed frame 1. In the event the diameter of the log was not sufficient to enable the saws to be operated at their maximum extent the caliper mechanism will assume the dotted line position of Figure 2 to swing the pivotal latch 40 clear of the lever 38 to permit the lever and hence the transverse diagonally slotted bars 35 and 22 to return to their normal position by the spring 37 to move the saws inwardly so that the spacing between the saw pairs will enable the outsized or small diameter log to be cut.

Supported on the bed frame 1 beyond the end of the V-guides 10 beyond the first pair of saws 14 are the longitudinal guides 46 and 47, as shown in Figure 6, with the latter guide 47 being in the form of a rolled or curved surface.

The guide 46 is horizontally slotted and through the slots of this guide operate the spaced pivotal strikers 48, the outer ends 49 of which are connected with the vertical lever 50, the lower end of which in turn is connected with the pivotal arm 51 in the form of the yolk having an extension 52 projecting into the path of the chain lugs 8.

After the log has been fed through the first set of saws 14 by the conveyor it will be provided with the parallel faces 53 as shown in Figure 6, and the spacing of the conveyor lugs 8 is such that when the log has been fed completely through the first saw pair and is within the guides 46 and 47 the arm 51 will be actuated by the conveyor and the log will, through the vertical lever 50, be struck near the bottom by the strikers 48 which are swung from a position alongside the guide 46 outwardly towards the guide 47. Immediately upon delivering the blow the strikers will be returned to their normal position by the spring 54.

The striking of the log near its bottom or supported face with the sharp blows effected by the strikers will upset or turn the log through 90° to the dotted line position of Figure 6. The curved surface of the bottom of the log will assist in this upsetting or rolling over of the log, but should it resist turning for any reason it will be forced up the curved surface of the guide 47 which acts in the manner of a guide cam to assist in the overturning motion.

The turning of the log about its longitudinal axis through the 90° to bring the parallel faces 53 horizontal while the log is still being conveyed without interruption of the conveyor movement places the log in position to be introduced into the second pair of saws 26.

To ensure that the log is properly centered when being fed through the second saw pair the centering device of Figure 7 is utilized. This device consists of a pair of pivotal guide plates 53' which extend upwardly through the bed frame 1 and carry the inwardly projecting log-engaging bosses 54. These pivotal guide plates 53' extend longitudinally of the guide frame ahead of the saws 26 to receive the log after it has been overturned by the strikers 48.

Mounted on a suitable bracket 55 above the plates 53' are a pair of meshing quadrants 56 having extensions 57 in the form of longitudinal arms rigidly secured thereto and resting on the outer edges at the upper longitudinal edges of the guides 53'. Extending between these arms 57 is a spring 58. The displacement of the log when overturned to one side of the centre line of the bed frame will move one of the arms 57 outwardly, and through the quadrants 56 move the opposite arm outwardly, releasing the force acting to force the pivotal guide engaged by said latter arm and causing an increased spring tension to return the originally displaced arm to its normal position. Thus the pressure against the one side of the log will be increased, while the pressure against the opposite side will be decreased and the log will be moved back into the centre line of the bed plate. Continued feed of the log will move it through the second pair of saws 26 and the uncut portions of the log extending between the faces 53 will be cut to complete the squaring of the log into a length of timber suitable for railway ties or for construction beams or the like.

It will be understood that during the squaring of the log it moves continuously from one end of the machine to the other through the first set of saws, the overturning mechanism, the centering mechanism and then through the second set of saws to the delivery end of the machine, and logs may be fed through in a continuous stream with great rapidity.

In practice, since the logs are to be cut to rectangular timbers the initial spacing of the saws is set so that the one saw pair 14 is different from the other saw pair 26. This adjustment is obtained through the preset adjustment of the position of the ends of the longitudinal bars 19 and 31 by altering their positions through adjustment with the transverse bars 20 and 34.

With the calipering mechanism described which controls the latch 40, and hence through the latch the position of the lever 38 the spacing of the parallel saws, the machine will automatically adjust itself so that in the event a log, of a diameter too small to permit it to be squared to the desired dimensions, is fed into the machine the saws of each saw pair will assume a different or closer relative position to cut the small diameter log to a desired cross sectional dimension permitted by the size of the log.

Where required the slabs cut from the log while in the squaring operation may be guided out of the machine by the suitable guide deflectors located beyond the saws.

The great advantage of my machine is the fact that the log is completely formed into a squared timber ready for use in the single operation of the machine, and the machine may be set up close to the point of cutting of the logs and the completed timbers or ties only need be transported to their destination.

While the one caliper or measuring mechanism is shown as controlling the spacing of both of the saw pairs, it will be understood if desired each saw pair may be controlled independently, whereby the capacity of the machine may be increased where the logs have not been previously sized for approximate corresponding sizes. Similarly, other forms of mechanism for overturning the log may be utilized without departing from the scope of my invention.

It will be noted that the term "squaring" the log refers to forming the log into a longitudinal rectangular timber which may be either square in cross section or rectangular in cross section.

Further, the term "rotating" the log means turning the log about an axis longitudinal of the log.

While one particular application of the machine is the forming of railway ties, the machine may equally as well be used to form structural timbers to be used in the construction field.

What I claim as my invention is:

1. A machine for cutting ties or the like, comprising a pair of parallel saws each slidable relative to a center line to vary the spacing therebetween, a second pair of parallel saws spaced from said first saw pair and each slidable relative to a center line to vary the spacing therebetween, means to operate said saws, means to convey a log longitudinally first between one of said saw pairs and subsequently between the other of said saw pairs, guide means to center the log on the center lines between said saws when passing therebetween, means to effect the rotation of said log through approximately 90° about its longitudinal axis during its movement between said saw pairs whereby the cuts made on said log by one of said saw pairs are in substantially right angular relation to the cuts made on said log by the other of said saw pairs to form said log into a length of timber of substantially rectilinear cross section and means gauging the diameter of the log prior to entry between said saws and operatively connected to move the saws of each pair relative the center line therebetween in accordance with the diameter of the log gauged.

2. A machine for cutting ties or the like, comprising a pair of circular saws supported in parallelism to rotate about a horizontal axis and spaced apart corresponding to one cross sectional dimension of a tie or the like to be cut, a second pair of parallel circular saws spaced from said first pair of saws and supported to rotate about a vertical axis with the saws of said latter saw pair spaced apart corresponding to the other cross sectional dimension of said tie or the like, means for rotating said saws about said horizontal axes, an endless conveyor for carrying a log longitudinally first between one of saw pairs and then between the other of said saw pairs said saw pairs having their saws spaced an equal distance each side of said conveyor, means for turning said log through substantially 90° between said saw pairs whereby said second saw pair cuts said log at right angles to said first saw pair and guide means between said saw pairs to shift a log cut by said first saw pair and overturned by said turning means laterally of said conveyor to be centered on said conveyor.

3. A machine for cutting ties or the like, comprising a longitudinal frame having a longitudinal center line, an endless chain running longitudially of said frame along the center line of the machine and having lug projections thereon to engage and move a log longitudinally along said frame, a pair of parallel circular saws journalled on a horizontal shaft either side of said chain equally spaced therefrom and slidable on said shaft to vary the spacing therebetween, means to effect movement of said saws in unison in opposite direction on said horizontal shaft while maintaining equal spacing each side of the chain, a second pair of parallel circular saws spaced from said first saw pair and journalled on a horizontal shaft either side of said chain equally spaced therefrom and slidable on said latter shaft to vary the spacing therebetween, means to effect movement of said latter saws in unison in opposite direction on said latter horizontal shaft while maintaining equal spacing each side of said chain, means to rotate said saws, guide means to centre the log on said frame while being conducted longitudinally by said endless chain through said saw pairs, caliper mechanism for gauging said log operatively connected to control said means to effect movement of said saw pairs, and means for rotating said log through substantially 90° after passing between said first saw pair and before being conducted through said second saw pair.

4. A machine for cutting ties or the like, comprising a longitudinal conveyor having lug projections to engage and convey a log longitudinally thereof, a pair of parallel saws spaced either side of said conveyor and movable to vary the spacing therebetween while maintaining parallelism, a second pair of parallel saws separated from said first saw pair and spaced either side of said conveyor and movable to vary the spacing therebetween while maintaining parallelism, means for moving the saws of said saw pairs to vary the spacing therebetween, spring means actuating said latter means to move said saws towards a position of minimum spacing, a lever operatively connected with said saw-moving means and arranged to project into the path of said conveyor lugs to be engaged thereby to move said saw-moving means to actuate said saws towards a maximum spacing, a latch swingable to a position to engage said lever to hold said saws in position of maximum spacing and retractible to release said lever to allow said spring means to move said saws towards the position of minimum spacing, caliper mechanism for gauging the log being conveyed by said conveyor and operatively connected with said latch to actuate said latch to said lever-engaging position upon the log having a diameter sufficiently large to be cut with the saws at maximum spacing and to the retracted position upon the log having a diameter less than that required for maximum spacing of said saws, and means for overturning said log while between said saw pairs to place the log when passing through the second saw pair in right angular relation to its position when passing through said first saw pair.

5. A machine as claimed in claim 4 in which said means for overturning said log comprises a pair of strikers pivoted at one side of said conveyor and swingable to strike the log below the longitudinal centre of gravity thereof, a lever projecting into the path of the lugs of said conveyor, and linkage transferring the movement of said lever when struck by the lugs of said conveyor to said strikers to strike said log, and means to constrain the movement of said log under the impact of said strikers to prevent said log from moving laterally without overturning under the strikers' impact.

6. A machine as claimed in claim 5 in which said means for constraining the movement of said log laterally under said strikers comprises an upwardly and inwardly curved guide surface forming a cam guide to facilitate the overturning of the log.

7. A machine as claimed in claim 4 in which a centering mechanism is provided to centre the log being fed through said second saw pair, and guide means are provided to centre the log being moved through said first saw pair.

8. A machine as claimed in claim 6 in which said centering mechanism comprises a pair of pivotal guides pivoted adjacent their lower edge either side of said conveyor and having projections to engage the log being conveyed into said second saw pair, a pair of meshing quadrants pivoted above and centrally between said guides, extensions carried by said quadrants and engaging the upper edges of said guides, a spring extending between said extensions and urging said guides inwardly to bring the projections carried thereby into engagement with said log, said quadrants being adapted to mesh whereby the location of the log off the centre of said conveyor will result in an increased pressure through the guide in direction of discplacement of the log to return the log to centre while a decreased pressure will be exerted on the log by the other of said guides.

JAMES H. LORIMER.

REFERENCES CITED

The following references are of record in the file of this patent:

UNITED STATES PATENTS

| Number | Name | Date |
|---|---|---|
| 141,761 | Carroll | Aug. 12, 1873 |
| 148,799 | Austin | Mar. 24, 1874 |
| 714,098 | Caldwell | Nov. 18, 1902 |
| 1,779,769 | Hagar | Oct. 28, 1930 |